United States Patent [19]
Godbersen

[11] Patent Number: 5,950,735
[45] Date of Patent: Sep. 14, 1999

[54] UNIVERSAL ASSEMBLY FOR COUPLING TOWABLE AGRICULTURAL IMPLEMENT TO A TOWING VEHICLE

[76] Inventor: Byron L. Godbersen, Lake LaJune Estates, Ida Grove, Iowa 51445

[21] Appl. No.: 08/795,130

[22] Filed: Feb. 7, 1997

Related U.S. Application Data

[63] Continuation-in-part of application No. 08/618,033, Mar. 25, 1996, abandoned.

[51] Int. Cl.$^6$ ....................................................... B60D 1/00
[52] U.S. Cl. ............................. 172/439; 172/753; 37/468
[58] Field of Search .................................... 172/439, 683, 172/753, 445; 37/231, 468

[56] References Cited

U.S. PATENT DOCUMENTS

| | | |
|---|---|---|
| 2,822,739 | 2/1958 | Altgelt . |
| 2,881,581 | 4/1959 | Evans et al. . |
| 3,001,590 | 9/1961 | Tsuchiya . |
| 3,181,619 | 5/1965 | Smith et al. . |
| 3,237,701 | 3/1966 | Morkoski . |
| 3,292,949 | 12/1966 | Restall . |
| 3,306,630 | 2/1967 | Weiste . |
| 3,312,290 | 4/1967 | Abbott . |
| 3,379,457 | 4/1968 | Restall et al. . |
| 3,432,184 | 3/1969 | Tweedy . |
| 3,722,915 | 3/1973 | Gail . |
| 3,736,845 | 6/1973 | Weiste et al. . |
| 3,951,435 | 4/1976 | Greatbach . |
| 4,015,855 | 4/1977 | Murray . |
| 4,069,885 | 1/1978 | Gego et al. . |
| 4,153,116 | 5/1979 | van Tonder . |
| 4,431,207 | 2/1984 | Langenfeld et al. . |
| 4,477,101 | 10/1984 | Nilsson et al. . |
| 4,509,768 | 4/1985 | Haug . |
| 5,743,339 | 4/1998 | Alexander, III ..................... 172/439 X |

FOREIGN PATENT DOCUMENTS

| | | |
|---|---|---|
| 2103240 | 8/1972 | Germany . |
| 6415263 | 7/1965 | Netherlands . |
| 1083936 | 4/1984 | U.S.S.R. . |
| 868473 | 5/1961 | United Kingdom . |
| 1110361 | 4/1968 | United Kingdom . |
| 1369935 | 10/1974 | United Kingdom . |
| 1568052 | 5/1980 | United Kingdom . |

OTHER PUBLICATIONS

Copy—6 page brochure by Walterscheid entitled Claw Hitch –Makes It.
Easy—Simplest method yet for hitching and unhitching equipment!, Date Unknown.
Copy—2 page brochure from Jiffy Hitch Distribution Inc., Date Unknown.
Chapin Equipment CO., Triangle Quick Coupling System. Reference is made to an independent $^s$tudy of quick–hitches conducted in 1984 by Perrson & Kofoed, although the nature of the tests and the date of the attached document are unknown.—11 pages.

Primary Examiner—Christopher J. Novosad
Attorney, Agent, or Firm—Henderson & Sturm

[57] ABSTRACT

The female unit is movably connected at its upper end to the implement upper end by a link device providing both vertical and horizontal pivotal adjustability therebetween, while their lower ends are pivotally connected.

13 Claims, 9 Drawing Sheets

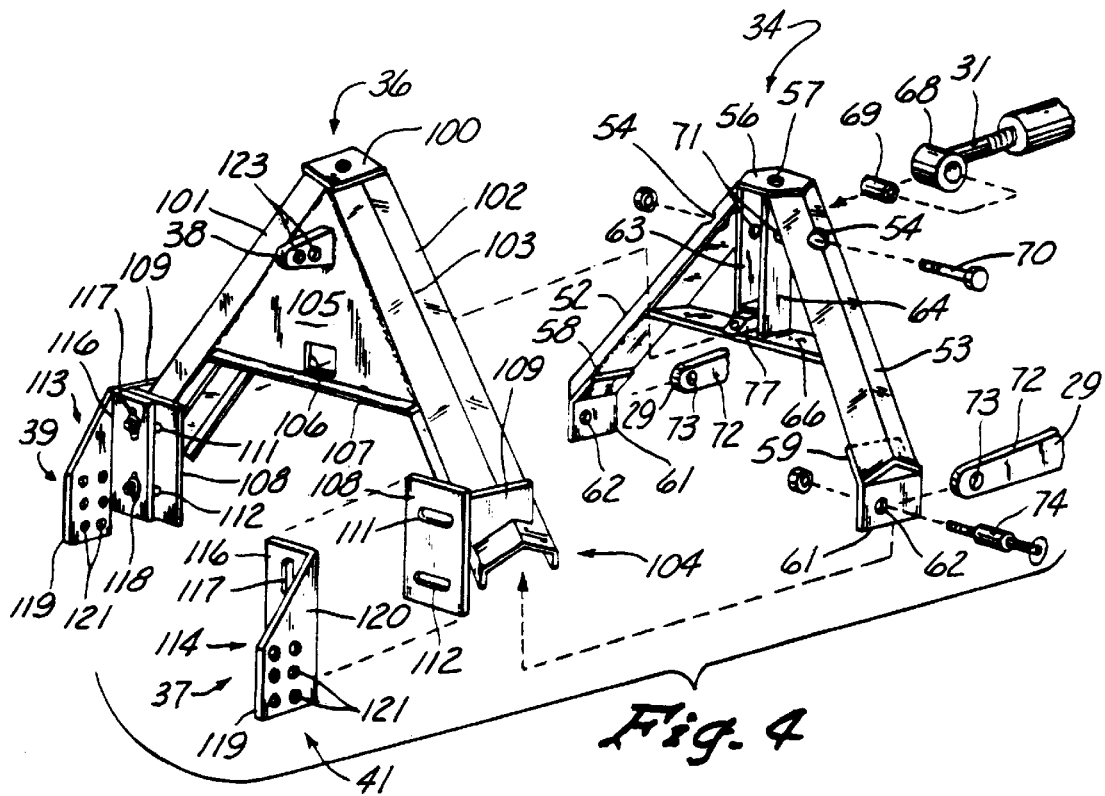
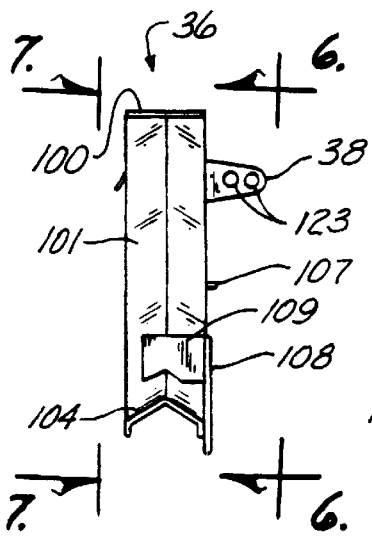
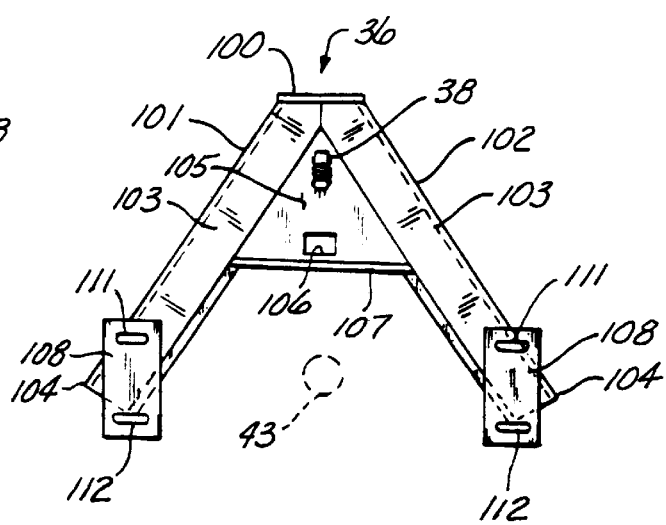

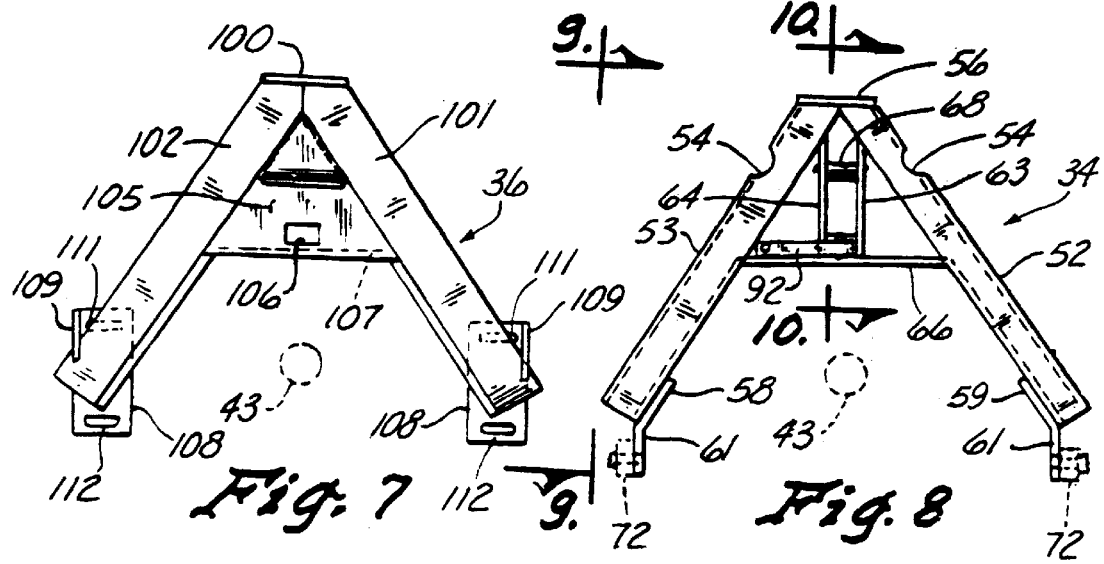
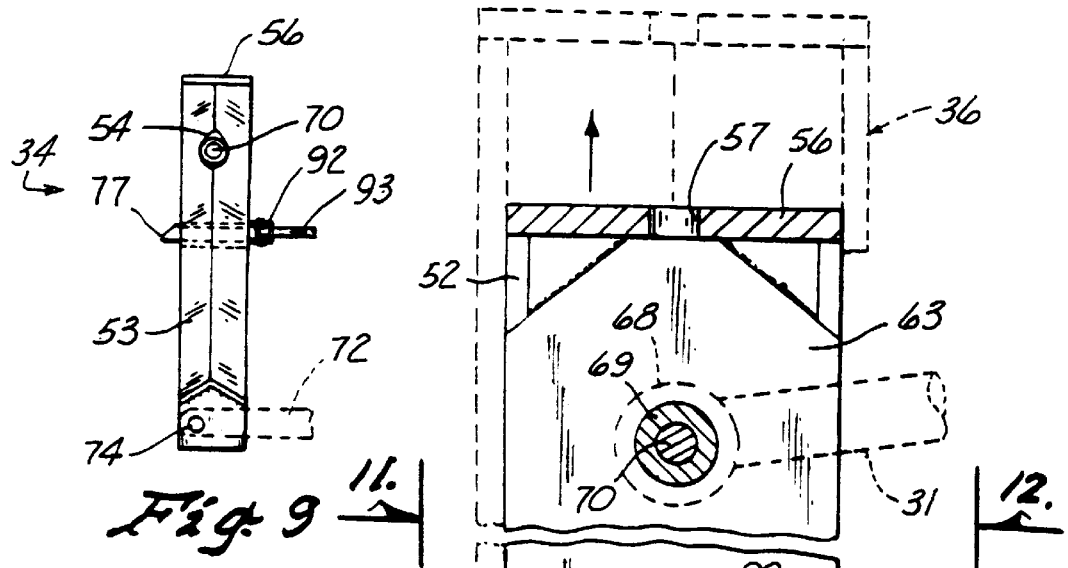

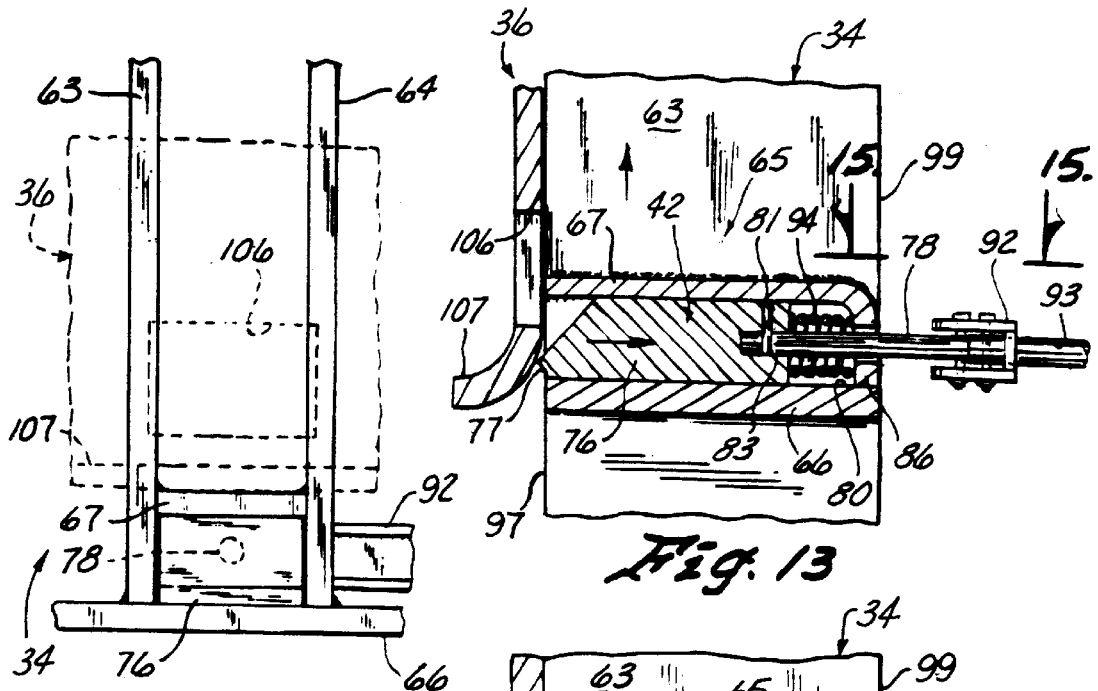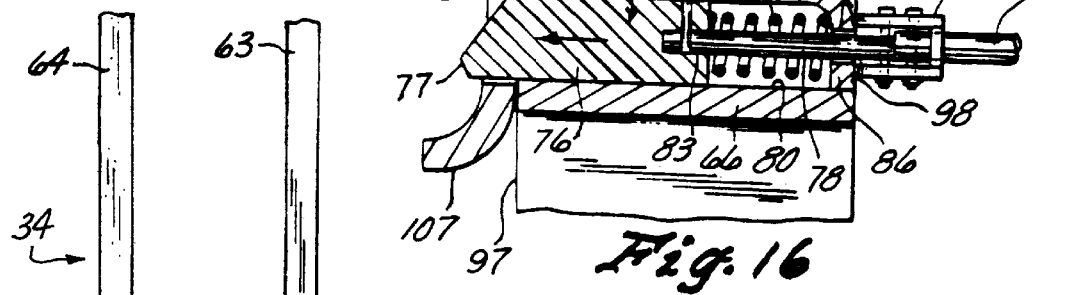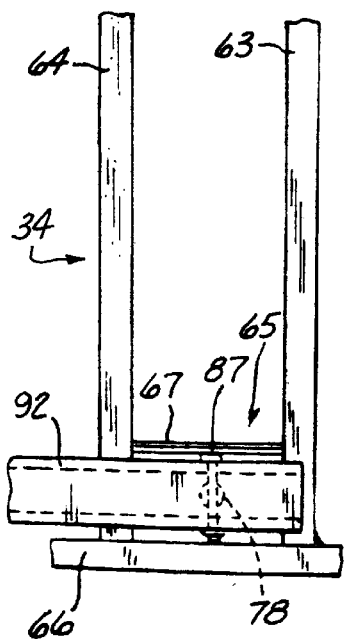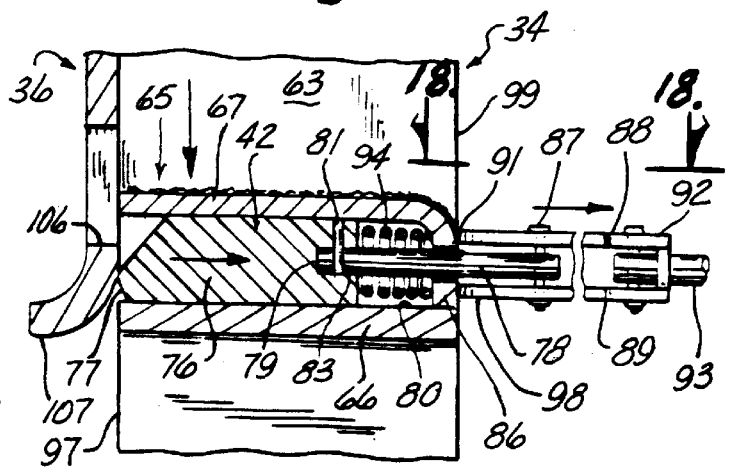

UNIVERSAL ASSEMBLY FOR COUPLING TOWABLE AGRICULTURAL IMPLEMENT TO A TOWING VEHICLE

This application is a continuation-in-part of earlier filed application Ser. No. 08/618,033 filed Mar. 25, 1996, now abandoned.

TECHNICAL FIELD

This invention relates generally to connecting towable implements to a prime mover, such as a tractor, and particularly to an assembly easily operable from the tractor seat or cab for quickly hitching and unhitching the implement to the three-point hitch of the tractor.

BACKGROUND OF THE INVENTION

Mechanization of farm equipment, particularly the type of equipment adapted for connection to tractors having a conventional three-point power lift and utilizing the power takeoff of the tractor has rendered increasingly difficult the hitching or coupling of the implements to the tractor.

The availability of heavier and more powerful tractors has in turn resulted in heavier and more complex implements, to the extent that manual coupling and uncoupling has become almost an impossibility and has become not only extremely unsafe, but time consuming. Further, with the advent of numerous new and improved implements to be towed, even with the voluntary requirement of those implements having coupling frames of certain dimensions for three-point coupling, the provision of a universal coupler has not been forthcoming.

In a recognition of the need for improvement in this field, several coupling arrangements have been developed for use with the three-point lift. One instance, as shown in U.S. Pat. No. 3,306,630 to Weiste, a pair of triangular frames are disclosed, one mounted on the three-point lift and the other on the implement, the frames adapted for a registering engagement for operation, but with no provision for a variance in the implement receiving frame, thus severely limiting the use of the coupling structure to more than one implement.

Anther instance is shown in U.S. Pat. No. 3,432,184 to Tweedy wherein a triangular plate adjustably mounted to the three-point lift is maneuvered into registering relationship with a like-shaped receiving element with inturned flanges on the sloping side edges for releasably lockingly receiving the plate. Again, although ample adjustability is provided for manipulating and locating the plate by hydraulic units attached to the tractor, no adjustability is provided for attaching the receiving element to the implement. Further, this structure prevents use of the tractor pto.

U.S. Pat. No. 3,722,915, while disclosing cooperating guides for guiding upward coupling movement of a coupling member into an opening for registration, is devoid of any teaching or suggestion of providing more versatility to the implement mounting.

It may be seen, therefore, that there is a definite need in this field of coupling a tractor mounted three-point lift to any one of a variety of implements, even where the implement's mounting frame has certain standard dimensions for three point connection, and a need for providing also for full use of the tractor pto in conjunction with the towed implement.

DISCLOSURE OF THE INVENTION

This invention provides a coupling assembly comprising a male unit adapted to be mounted in a normally vertically disposed manner to the three-point power lift of a tractor whereby the male unit can be maneuvered into a variety of positions within or without a vertical plane. The coupling assembly comprises further a female unit larger but shaped similarly to the male unit and adapted to receive the male unit in a self-centering nested manner. Provided also is a self-locking latch system operable upon the male and female units achieving the nested condition, whereby movement of the male unit by the tractor three-point lift effects like movement of the female unit.

A universal mounting unit is provided for variably attaching the female unit to any towed implement provided with a three-point receiving frame with dimensions similar to those of the female unit; and with the male and female units having triangular shapes with openings left between the depending sides, the tractor pto can be connected to a gear box or like driven unit mounted on the implement.

A manually engageable release rod is operable from the tractor seat or cab for releasing the latch system, whereby the three-point lift is then operable to lower and separate the male unit from the female unit. Due to the universality of the mounting unit, a female unit can be mounted on each implement such that a single male unit attached to the tractor three-point hitch can be operably transferred from implement to implement.

The invention contemplates as a mounting unit, three devices for attachment to the rear of the triangularly shaped female unit; an upper flange having one or more openings formed therein for connection by fasteners to the apex of the implement mounting frame; a pair of identical side mounts each including a flat plate for attachment in a normally vertical, transverse plane to a lower side corner of the female unit, which plate is adapted to horizontally adjustably receive an angle member also disposed in a vertical plane, and with the angle member having one flange vertically, adjustably securable to the plate. The angle member is provided further with another flange disposed at right angles to the first flange and having openings formed therein in vertical and horizontal alignment for like adjustable attachment to laterally spaced receiving members on the implement mounting frame.

The invention contemplates further the upper flange adapted to receive a connecting link in vertically adjustable positions, with the link also adjustably connected to an upper portion of the implement connecting frame. This structural arrangement, providing for the height between the lower side mounts and the top, upper flange to be adjustable—via the link, provides enhanced flexibility to the coupling assembly for connecting a greater variety of implement to the prime mover.

Additionally, the vertical adjustability of the connecting link, the latter normally horizontally disposed, provides for the capability of the female unit to be disposed in as much a vertical position as possible when at rest, mounted semi-permanently on the implement. Some implements have a tendency to either lean forward or backward from vertical when unhooked, such that the link connection may compensate for that.

Lastly, with the link pivotally connected at both ends between the implement and the coupling assembly, a floating action is provided for those implements, such as rotary mowers and the like, which need to float with the ground surface rather than being fixed in a single position relative to the prime mover. This permits each implement to maintain its functional integrity.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 4 is an enlarged exploded perspective view of the coupling assembly;

FIG. 5 is an enlarged side elevational view of the female unit of the assembly;

FIG. 6 is an elevational view of the rear of the female unit as taken along the line 6—6 in FIG. 5;

FIG. 7 is an elevational view of the front of the female unit as taken along the line 7—7 in FIG. 6;

FIG. 8 is an enlarged elevational view of the front of the male unit as taken along the line 8—8 in FIG. 3;

FIG. 9 is a side elevational view as taken along the line 9—9 in FIG. 8;

FIG. 10 is a further enlarged, fragmentary sectional view as taken along the line 10—10 in FIG. 8, with certain elements in dash lines for clarity of illustration;

FIG. 11 is an elevational view taken along the line 11—11 in FIG. 10;

FIG. 12 is an elevational view taken along the line 12—12 in FIG. 10;

FIGS. 13, 16 and 17 are sectional views of the latching mechanism similar to FIG. 10, showing the various operating positions thereof;

BEST MODE FOR CARRYING OUT THE INVENTION

Figure 1:
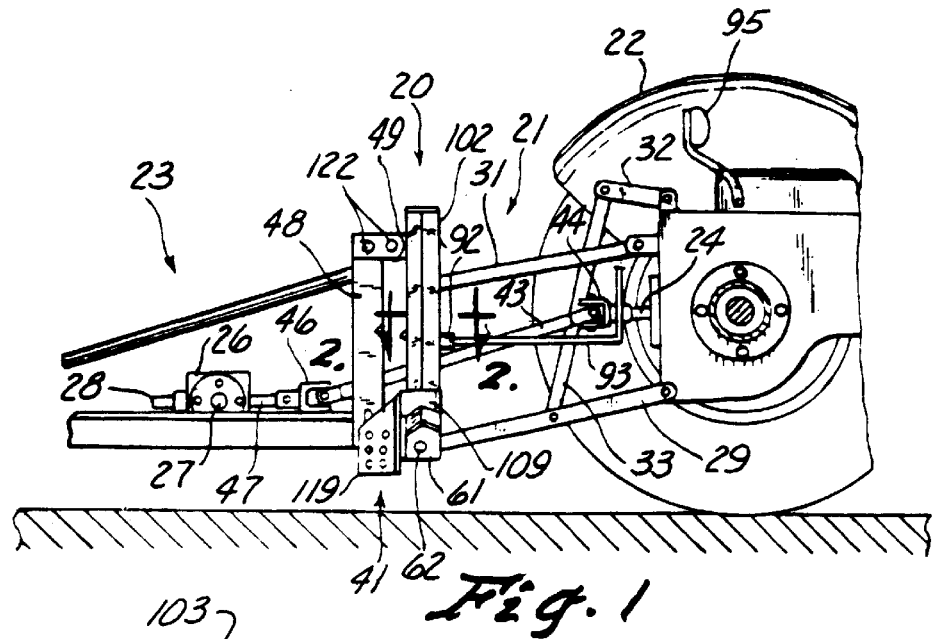
FIG. 1 is a fragmentary, side elevational view illustrating use of the invention for coupling a cultivator implement to a conventional tractor.

Referring now to the drawings, the coupling assembly of this invention is shown generally at (20) in FIG. 1, connecting a three-point power lift (21) of a conventional tractor (22) via the assembly (20) to a cultivator implement (23), the pto (24) of the tractor (22) being operably connected to a gear box (26) for providing a source of power for one or more drive shafts (27), (28) for the implement (23).

The tractor (22) is provided having a pair of draft arms (29) (FIGS. 1 and 4) and an adjustable link (31). The draft arms (29) are connected by links (32) (only one showing) to lift arms (33) (only one showing), this conventional three-point power lift (21) or hitch—as it may commonly be called, being capable of raising and lowering the draft arms (29) in a conventional manner. The adjustable link (31) may be manually adjustable using a threaded arrangement as shown (FIG. 4), or it may be hydraulic, both for the purpose of varying the length of the link (31) relative to the lengths of the draft arms (29) for adjusting when necessary, the position of that which is held thereby, such as for example, the male unit (34) (FIGS. 1 and 4) of the coupling assembly (20).

Figure 2:
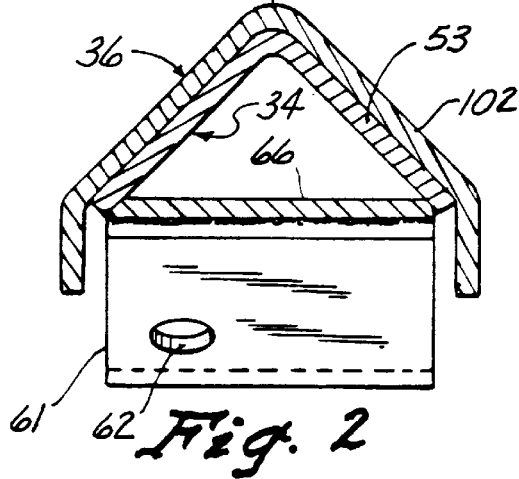
FIG. 2 is an enlarged cross-sectional view of nested sections of the male and female units as taken along the line 2—2 in FIG. 1.

In addition to the male unit (34), the coupling assembly (20) comprises generally a female unit (36) slightly larger and shaped similarly to the male unit (34) and adapted to receive the male unit (34) in a self-centering, nested manner (FIGS. 1 and 2). The assembly (20) comprises further a universal mounting unit (37) (FIG. 4) which includes a trio of triangularly spaced elements: an upper flange (38) and a pair of lower, laterally spaced side mounts (39), (41). The coupler (20) is completed with a self-locking latch unit (42) (FIGS. 10–18) mounted on the male unit (34) for self-locking co-action with the female unit (36), and provided with an operator assisted release mechanism whereby the male and female units (34), (36) are detachable, with the implement (23) thereby separated from the tractor (22).

Referring to FIG. 4, it is seen that ample space is provided by the A-shape of the male and female units (34), (36) for passage therethrough of a drive shaft (43) interconnected by U-joints (44), (46) at opposite ends (FIG. 1) to the pto (24) and a driven shaft (47) on the gear box (26). It will be seen further that although adjustments of the positioning of the coupler (20) is provided in horizontal and/or vertical planes without comparable movement of the tractor (22) and the pto (24), the pto drive shaft (43) remains unaffected.

The implement (23) is provided with a frame (48) for securement to the female unit (36), which frame (48) typically has triangularly spaced attaching elements, an upper element (49) (FIG. 3) at the apex of the triangular mounting arrangement, and a pair of laterally spaced elements (51) (only one showing) at the lower, normally horizontally spaced sides of the frame (48), completing the triangular spacing.

Figure 3:
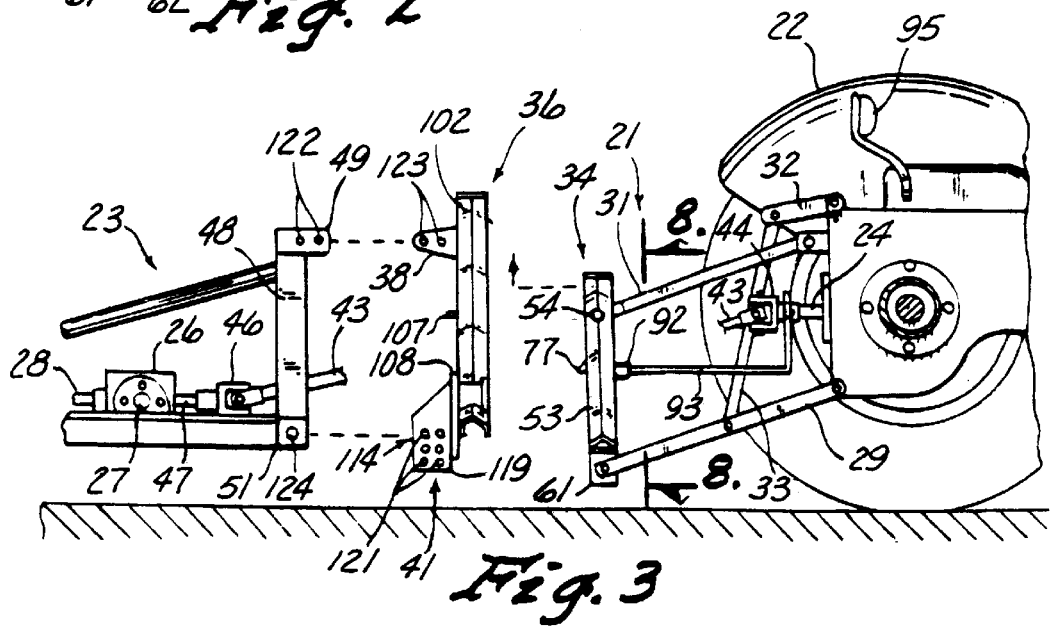
FIG. 3 is a view with the various components longitudinally separated, prior to coupling as shown in FIG. 1.
Figure 14:
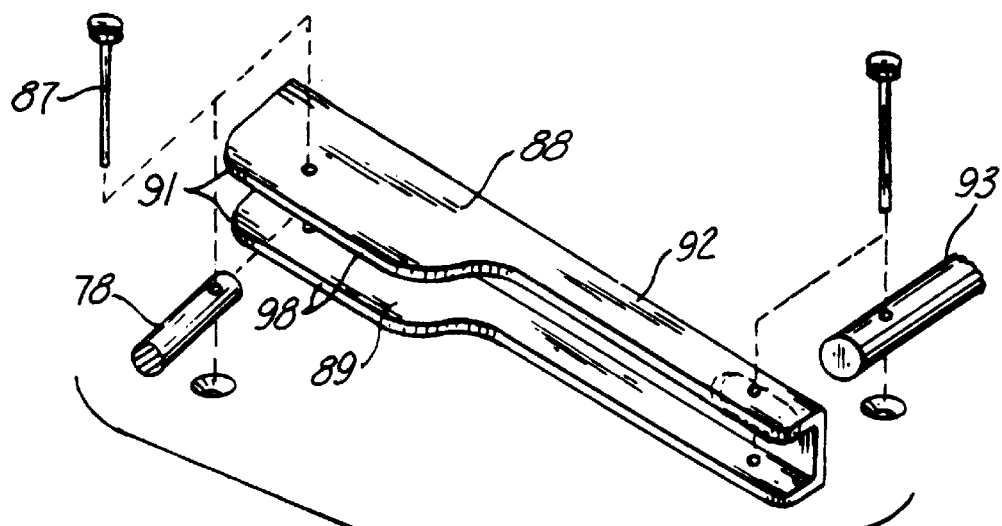
FIG. 14 is an exploded, perspective view of components of the latching mechanism.

Referring particularly to FIGS. 2–4, the male unit (34) has an A-shape and includes a pair of identical V-shaped channels (52), (53) each having an opening (54) adjacent upper, converged ends joined, as by welding for example with a flat top cap (56) also having a central opening (57). The channels (52), (53) are secured facing each other with their apexes to the outside (FIG. 4), and the outer laterally spaced lower ends of the channels (52), (53) have identical side plates (58), (59) secured thereto, as by welding for example, with each plate (58), (59) (FIG. 8) having a depending portion (61), the portions (61) parallel each other and having openings (62) formed therein which are laterally aligned.

A pair of plates (63), (64) (FIG. 4) depend in laterally spaced parallel relation from the top cap (56), the lower ends of the plates (63), (64) secured to a transversely disposed cross member (66), and with an upper cover (67) (FIG. 10)

spaced between the plates (63), (64) and above the member (66) to form a housing (65) for the latch unit (42) as described hereinbefore.

The male unit (34) is detachably connected to the three-point lift (21) by a bearing end (68) (FIG. 4) of the adjustable link (31) receiving a sleeve (69) mounted on a bolt (70) or like fastener inserted through the aligned channel openings (54) and aligned openings (71) formed in the plates (63), (64). The outer ends (72) (FIG. 4) of the draft arms (29) also have openings (73) formed therein for alignment with the openings (62), and through which fasteners (74) are inserted. It should be noted that with the longitudinal adjustability of the link (31), and as the male unit (34) can pivot freely about horizontal axes of the sleeve (69) and the fasteners (74), the male unit (34) is movable into and out of a vertical plane by action of the power lift (21) for adjusting its position for lifting engagement with the female unit (36).

Figure 15:
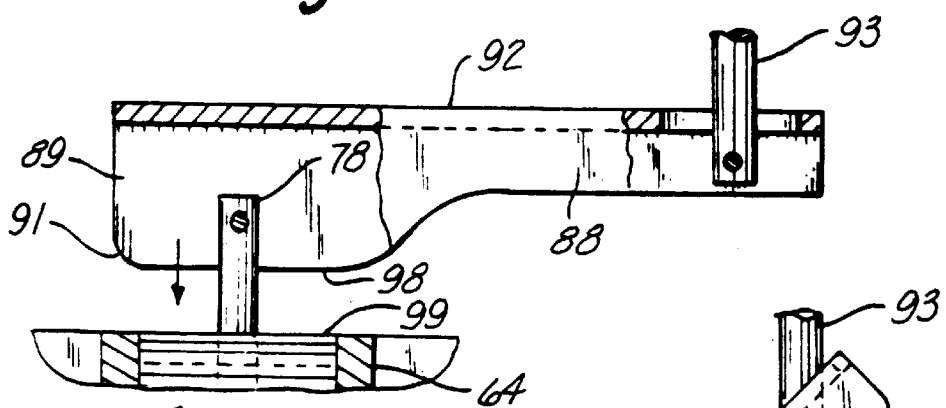
FIG. 15 is a plan view taken along the line 15—15 in FIG. 13.

Referring now to FIGS. 10–18, the latch unit (42) includes a plunger (76) movably mounted for fore-and-aft movement within the latch housing (65) and having a head (77), a bore (79) formed within the plunger (76) for receiving a rod (78). A pin (81) is inserted through the plunger (76) and also through the inserted end of the rod (78) to secure the two parts (76), (78) together. The rod (78) extends through an open space (80) in the housing (65) and an opening (84) in the front wall (86) of the housing (65) to a rear end pivotal connection at (87) with a pair of flanges (88), (89) (FIG. 14), each flange having rounded ends (91) (FIG. 15). The flanges (88), (89) are integral with a lever arm (92), the arm (92) in turn connected to a rod (93) (FIGS. 1 and 3) which is shown extended to the tractor seat (95) for operator control. As indicated hereinbefore, the rod (93) may be extended into a cab (not shown).

A spring (94) (FIG. 10) is inserted into the housing open space (80), engaging the housing wall (83) at one end and the front surface (96) of the plunger (76) at the other end for biasing the plunger (76) rearwardly within the housing (65) toward a position (FIG. 10) wherein the head (77) extends rearwardly of the rear face (97) of the male unit (34). In this position of the plunger (76), the flanges (88), (89) are disposed with their sides (98) (FIG. 10) flush against the front face (99) of the unit (34).

Figure 18:
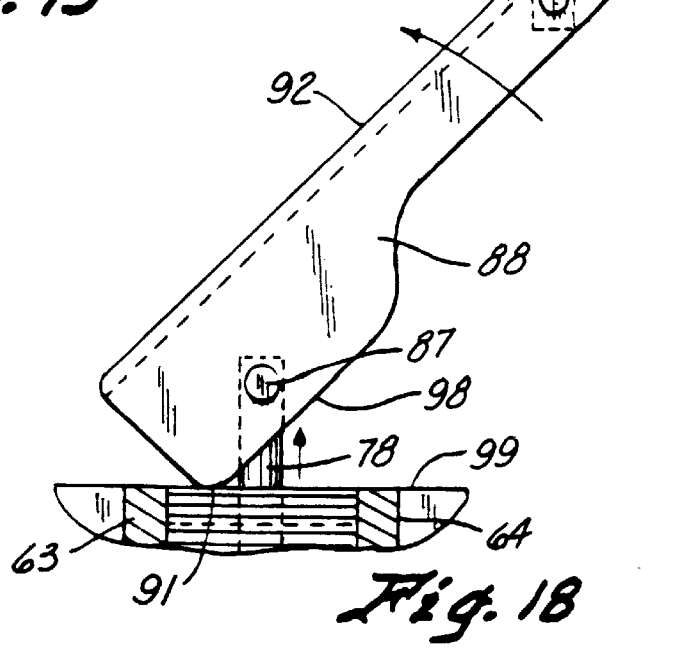
FIG. 18 is a view similar to FIG. 15, taken along the line 18—18 in FIG. 17.

Referring to FIGS. 17, 18, it will be noted that counter-clockwise rotational movement of the lever arm (92) about the pivot (87) causes the flanges (88), (89) to function as a lever, rotating about the front face (99) until their ends (91) engage the face (99), and whereby the rod (78) is pulled forwardly, pulling the plunger (76) forwardly also against the bias of the spring (94), thus retracting the plunger head (77) into the housing (65). In this condition, the male unit (34) may be lowered by the three-point lift (21) away from the stationary female unit (36), and separated thereby. Clockwise movement of the lever arm (92) and flanges (88), (89) about the pivot (87) permits the spring (94) to force the plunger (76) back to its normal position (FIG. 10), it being realized that the distance from the pivot (87) to the sides (98) is shorter than that to the rounded ends (91) of the flanges (88), (89).

Referring primarily to FIGS. 3 and 4–7, the female unit (36) is slightly larger than the male unit (34) and comprises, similarly to the male unit (34), a pair of identical V-shaped channels (101), (102) with their upper ends converged and joined as by a top cap (100). As with the male unit channels (52), (53), the female channels (101), (102) face each other with their apexes (103) out, see FIG. 2. The lower ends (104) of the channels (101), (102) are laterally spaced to form an A-shape with a triangular plate (105) secured between the channels (101), (102) and forming a solid wall as part of the upper half of the A-shaped female unit (36), except for a rectangular opening (106) formed centrally of the lower portion of the plate (105) and directly above a stiffening lip (107) turned rearwardly, see FIG. 13, from the unit (36).

At the lower channel ends (104), the side mounts (39), (41) of the mounting unit (37) each comprise a flat plate (108) secured in a position parallel to the plane of the plate (105) as by another plate (109) notched to receive and nest with the apex (103) (FIG. 5) of each channel (101), (102). The flat plates (108) with rearwardly facing flat faces are normally vertically disposed and in transverse planes, and each have a pair of parallel, vertically spaced slots (111), (112) formed therein, which slots (111), (112) extend transversely to the normal direction of forward or rearward movement of the tractor (22) and the implement (23).

For vertical and horizontal adjustable attachment to the plates (108), a pair of angle members (113), (114) (FIG. 4) are provided. Each member (113) has one flange (116) with a flat face and with vertically spaced and extended slots (117), (118) formed therein, and has another flange (119) bent at right angles to the flange (116), the flange (119) also having an outer flat face (120) and having a plurality of vertically and horizontally spaced openings (121) formed therein.

To attach the female unit (36) to the implement frame (48), the angle members (113), (114) are disposed, for example, as illustrated in FIG. 4 with their second flanges (119) disposed to the outer side; and, depending upon the spacing dimensions of the frame upper element (49) and the lower transversely spaced element (51), fasteners (not shown) are inserted in aligned ones of openings (122), (123) (FIG. 4) in the frame upper element (49) and the upper flange (38), respectively, fasteners (not shown) are further inserted in aligned ones of the openings (121) in the second flange (119) and the opening (124) in the frame lower elements (51), and fasteners (not shown) are inserted in aligned slots (117), (118) of the first flanges (116) and slots (111), (112) of the flat plates (108), the flat faces of the plates (108) and first flanges (116) mating.

In certain instances, an implement (23) may be provided with outwardly extended connecting pins rather than openings (124), whereupon the angle members (113), (114) may first mate one of the flange openings (121) with each pin, using a cotter key or like fastener for securement, then mating the slots (117), (118) with the plate slots (111), (112). Optionally, the angle members (113), (114) may be welded to the implement frame (48); and further each member (113), (114) may be two pieces secured together in an angular manner as illustrated.

With the male unit (34) attached to the three-point lift (21) (FIG. 3), the female unit (36) attached to the implement (23), and with the pto structure partially assembled if necessary, but in a disconnected condition, the tractor operator positions the male unit (34) such that it is disposed parallel to but lower than the female unit (36). The male unit (34) is then moved such that its channels (52), (53) are directly below the channels (101), (102) of the female unit (36), and as the male unit (34) is raised by action of the power lift (21) (FIG. 10), the V-shape of the respective channels (52), (101) and (53), (102) (FIG. 2) effect a self-centering of the two units (34), (36). As the male unit (34) continues to be raised to a nested condition within the female unit (36) (FIG. 10), the protruding plunger head (77) engages the lip (107) and is forced forwardly (FIG. 13) against the bias of the spring (94)

until the head (77) reaches the plate opening (106) (FIG. 16) whereupon the plunger (76) springs rearwardly due to the spring (94) bias, thrusting the head (77) through the opening (106) and effecting a self-locking of the two units (34), (36) together.

Should use of the pto structure be desired, the drive shaft (43) and U-joints (44), (46) are then hook-ed up, it being noted in FIGS. 6–8 by the drive shaft (43) in dash lines that the shaft (43) is located in the lower half of the A-frame type units (34), (36) with ample space for both vertical and/or horizontal movement of the units (34), (36) relative to the drive shaft (43) in case of repositioning of the units (34), (36). As described hereinbefore, manipulation of the cable (93) then permits a lowering and separation of the male unit (34) from the female unit (36), assuming the pto structure is properly disconnected, whereupon further operation of the power lift (21) moves the male frame (34) away from the female unit (36).

To re-position the female unit (36) for use with another implement of different three-point connection dimensions, it is clearly seen that not only may be angle members (113), (114) (FIG. 4) be moved both vertically and horizontally relative to the plates (108), but also and importantly, due to their right angular formation, and with the flat rearwardly facing faces of the plates (108) capable of also mating with the flat faces (120) of the second flanges (119), either or both members (113), (114) may be reversed. Thus, either or both second flanges (119) may be adjustably attached to a plate (108) rather than a first flange (116) as illustrated.

In one alternate embodiment of the flange (38) (FIGS. 4–6), the flange (38) is replaced by a link system (126) (FIGS. 19–22) which provides for enhanced flexibility between the coupling assembly (20) and the implement (23). All other elements common to those illustrated in FIGS. 1–18 are indicated by common reference numerals.

The link system (126) includes a pair of plates (127), (128) (FIG. 20) secured in vertical, parallel relationship to the rear, upper portion (129) of the female unit (36') adjacent its apex. The plates (127), (128) are equidistantly spaced apart on either side of the vertical center of the unit (36'), which vertical center lies on the longitudinal axis of the coupling assembly (20'). A plurality—three in this instance, of openings (131) are formed in each plate (127), (128), the openings (131) being vertically spaced, and laterally aligned in pairs.

Further, the link system (126) includes a link unit (132) having a pair of elongated links (133) affixed in a parallel, spaced condition by a sleeve (134) secured to common ends of the links (133). The links (133) each have a plurality of passages (136) formed in longitudinally spaced relation therein, with opposed pairs of passages (136) transversely or laterally aligned. The sleeve (134) has a length sized to fit between plates (127), (128), such that the sleeve (134) may be aligned with any pairs of openings (131), the lower pair (131') (FIG. 20), for example, the plates (127), (128) connected, then, to the links (133) by insertion through the sleeve (134) of a pin (137). Cotter keys (138) (FIG. 20) are inserted, respectively, through holes (not shown) drilled in the ends of the pin (137), exposed externally of the plates (127), (128) to retain the pin (137) in place.

Similar to the connection of upper flange (38) (FIG. 3) with the frame upper element (49), a fastener (not shown) is inserted in a predetermined pair of aligned passages (136) (FIG. 19) of the links (133) with either one of the openings (122) of the element (49). It will then be understood that with the side mounts (39), (41) (FIG. 20) being pivotally secured to the frame lower elements (51) (FIG. 19), by aligning respective side mount openings (121) with implement frame opening (124), the female unit (36) may be disposed at angularly varied positions relative to the implement frame (48); and due to the flexibility of the link system (126), the upper ends of the female unit (36) and frame (48) can move relative to each other, or float, during the operation of the equipment. Both vertical and horizontal pivotal adjustable movement is thereby provided by the link system (128) between the upper end of the female unit (36') and the upper end of the implement frame (48), while the lower portions of the female unit (36') and implement frame (48) are pivotally connected.

Referring to FIGS. 19, 24–27, a latch unit (142) alternative to the latch unit (42) (FIG. 10) is disclosed, all other elements common to the structure of FIGS. 1–18 being indicated by common reference numerals.

Figure 23:
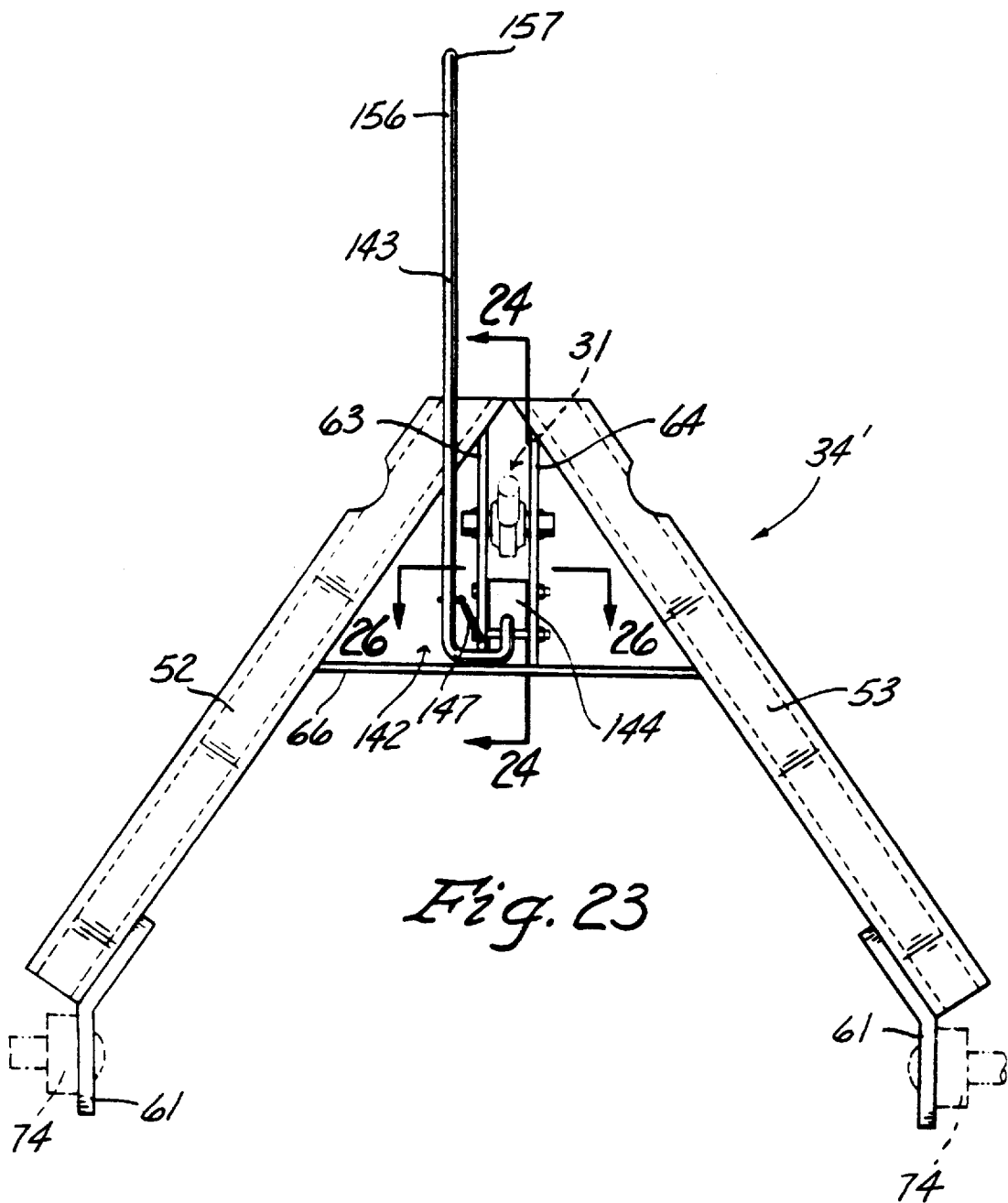
FIG. 23 is a front elevational view of the male unit similar to FIG. 8, showing an alternative latch system.

The latch unit (142) comprises generally an elongated handle (143) (FIG. 23), a latch (144) (FIG. 24) secured to a lower rear end (146) of the handle (143), and a spring (147) for biasing the handle (143) and latch (144) as a unit into a rest position for releasably locking the male and female units (34'), (36') together.

More particularly, the latch (144) is sized to movably fit between the plates (63), (64) (FIG. 26) of the single unit (34'), has a U-shape in side elevation with a rectangular shape in front, rear and plan elevation, and is pivotally connected by a pivot pin (148) affixed transversely between the plates (63), (64) and passed through a bore (149) formed therefor in the latch (144). The latch (144) has a flat bottom (151) spaced above the flat upper surface (152) (FIGS. 25) of the cross member (66) and has further a flat rear, vertical face (153) disposed flush with the rear face (97) of the male unit (34') when in a position as shown in full lines in FIGS. 25 and 27. The longitudinal center of the latch (144) lies on the longitudinal centerline of the assembly (20').

Figure 19:
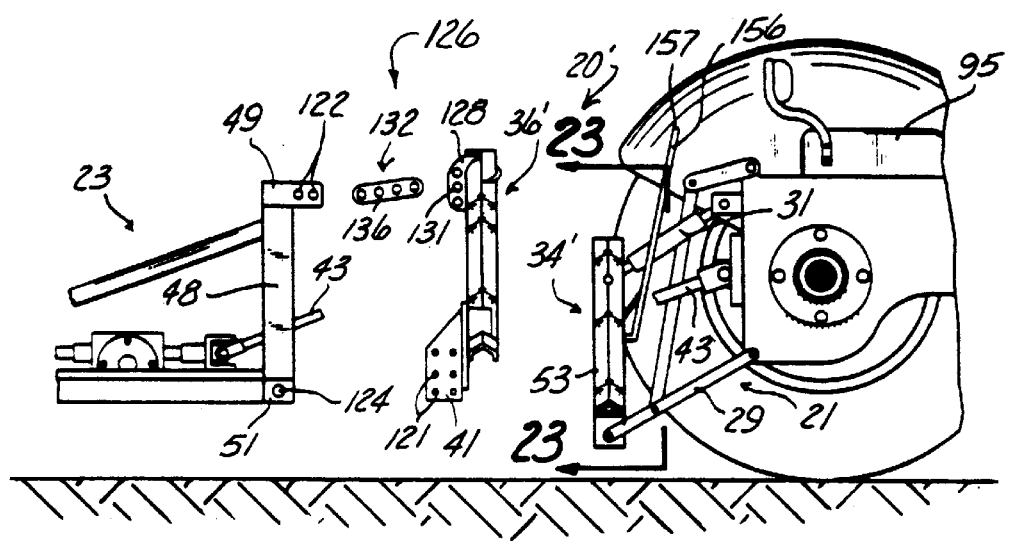
FIG. 19 is a view similar to FIG. 3, and showing alternate latch system and connecting link system embodiments.
Figure 20:
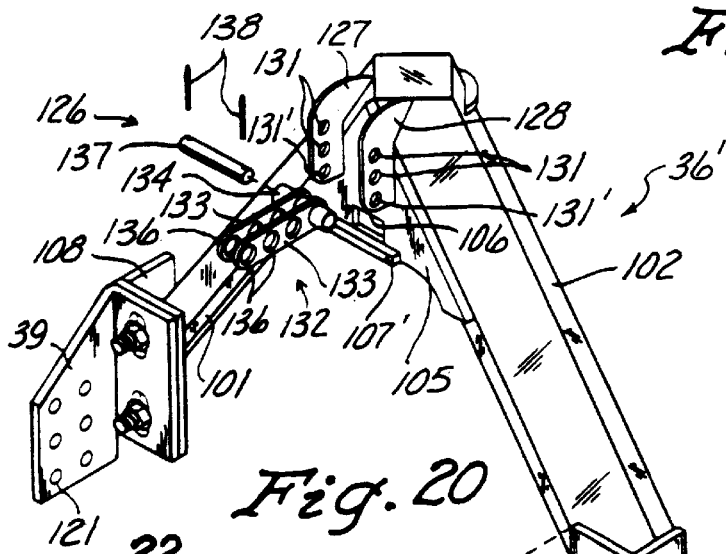
FIG. 20 is a partially exploded view of the alternative embodiments, similar to a detail of FIG. 4.
Figures 21, 22:
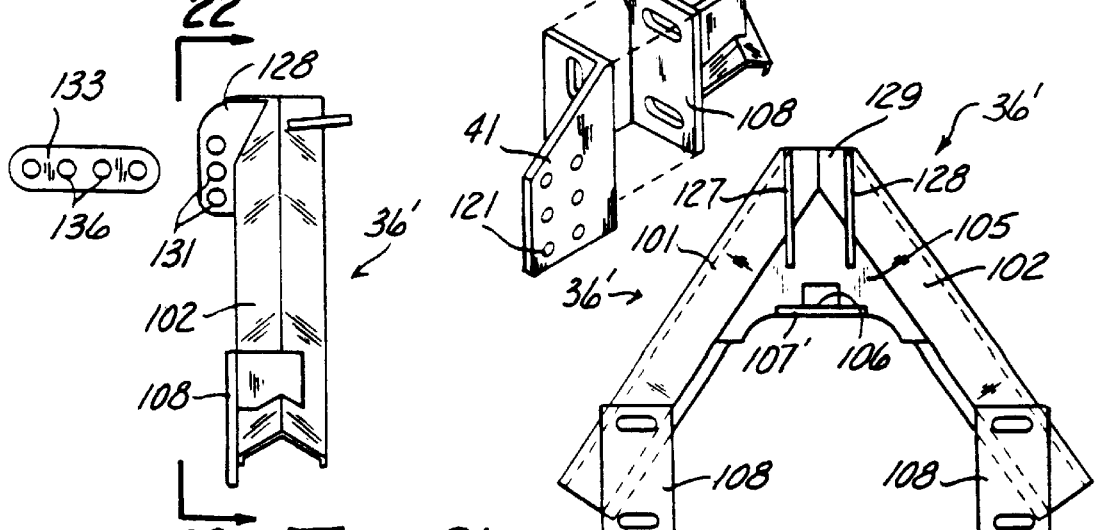
FIG. 21 is a partially exploded view similar to FIG. 5, taken from an opposite side.
FIG. 22 is a view taken along the lines 22—22 in FIG. 21.

The handle rear end (146) extends forwardly of the latch (144) beyond the front face (99) of the male unit (34') and has a right angular bend (154) in front of plate (64) (FIG. 26), from whence the handle has an upwardly extended, elongated portion (156) extended toward the tractor seat (95) (FIG. 19). The handle portion (156) is of a length sufficient so that the operator can reach backward from his position on the seat (95) and grab the upper end (157) to effect a releasing action of the latch unit (142) as described hereinafter.

Figure 24:
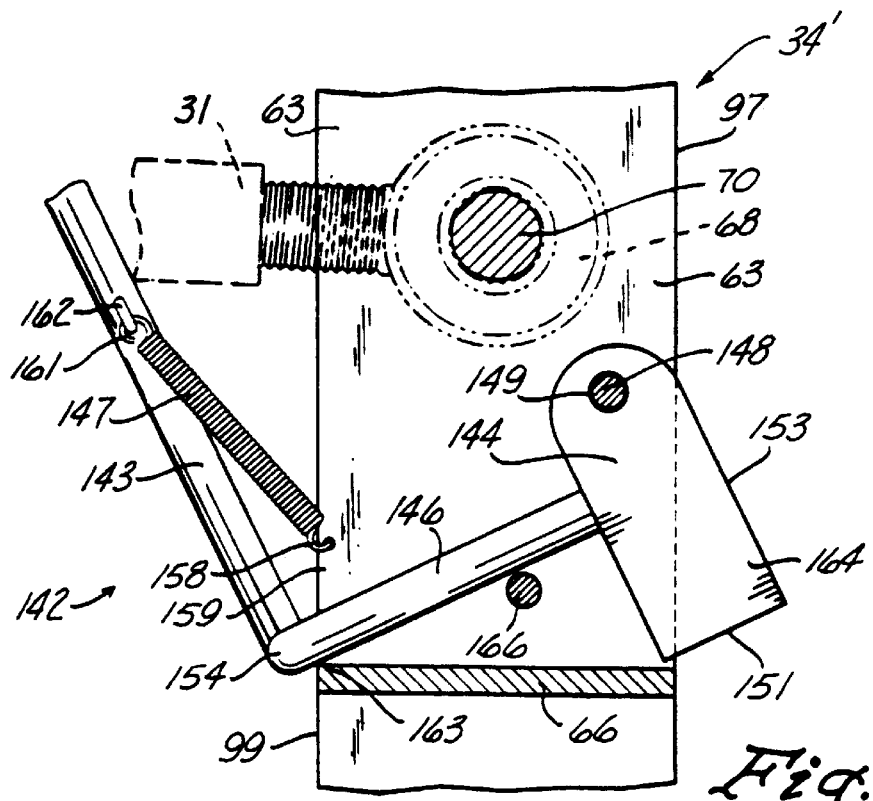
FIG. 24 is an enlarged, sectional view taken along the line 24—24 in FIG. 23, showing the alternate latch system in a rest position.

The spring (147) is of a conventional coil-type, one end (158) affixed to the plate (64) at a front edge (159), and the other end (161) attached to the handle (143) at a fastener (162) affixed to the handle (143) near the lower bend (154)(Fig. 24).

Figure 26:
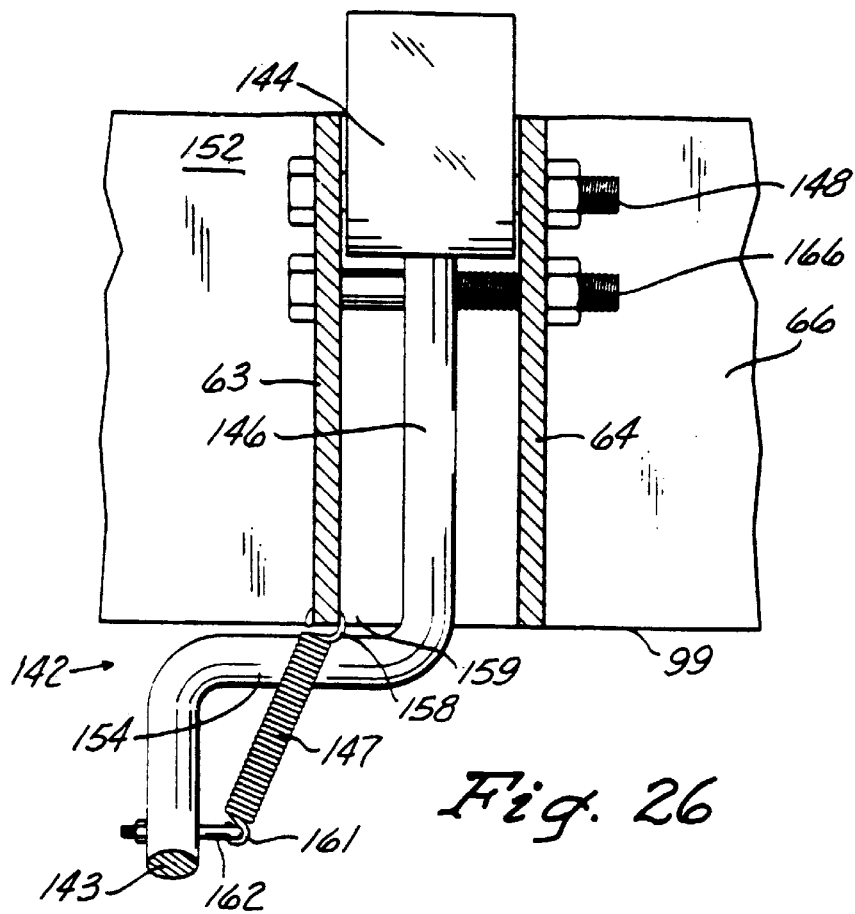
FIG. 26 is an enlarged sectional view in plan, taken along the line 26—26 in FIG. 23, showing the latch system in the rest position of FIG. 24.
Figure 27:
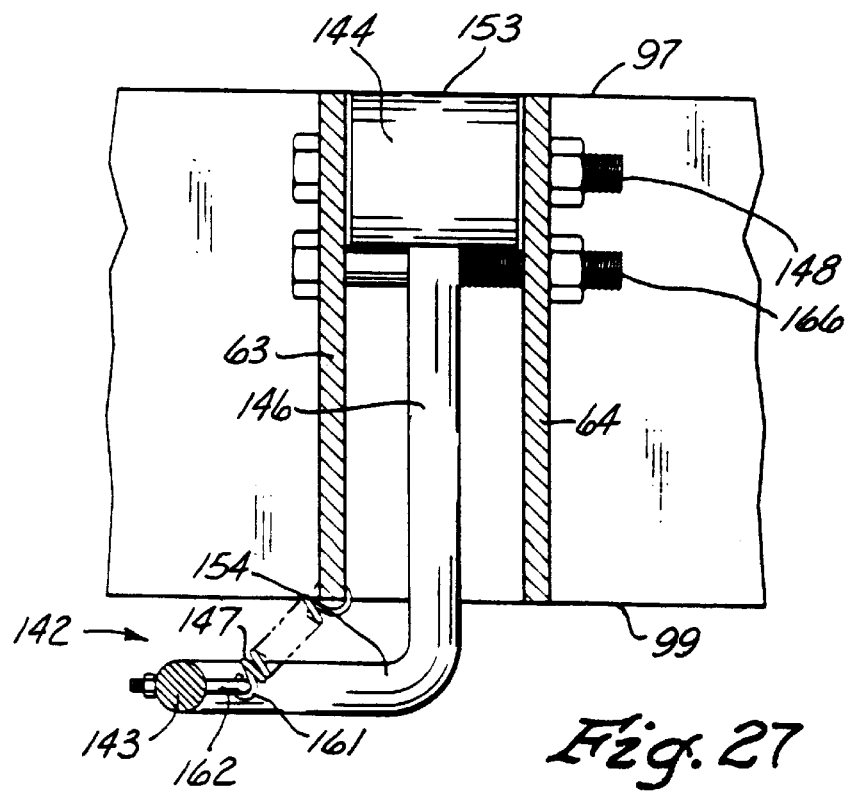
FIG. 27 is an enlarged sectional view, in plan, of the latch system in the actuation position of FIG. 25.

FIGS. 24 and 26 show the position of the latch unit (142) when the male unit (34') is non-attached to the female unit (36') (FIG. 19). The compression of the spring (147) has rotated the handle (143) and latch (144) as a unit in a counterclockwise direction as viewed, until the handle portion (146) rests upon the front edge (163) of the cross member (66). It will be noted in this biased position of the latch (144), the majority of the rear base portion (164) of the latch (144) protrudes rearwardly from the rear face (97) of the male unit (34'). This position of the alternate latch unit (142) is comparable to that of the latch unit (42) in FIG. 10.

Comparable in action to that of the latch unit (42) as shown in FIGS. 13, 16 and 17, upon the placing of the male unit (34') directly beneath the female unit (36') (FIG. 19), and a raising of the male unit (34') upwardly toward the female unit (36'), all by action of the three-point hitch (21), the V-shape of the channels (52), (53) moving into the channels (101), (102), respectively, effects a self-centering, nested relationship of the two units (34'), (36'). As the male unit (34') continues to be raised, the lip member (107') (FIGS. 20) secured to the plate (105) directly below the opening (106), engages the protruding latch (144).

Figure 25:
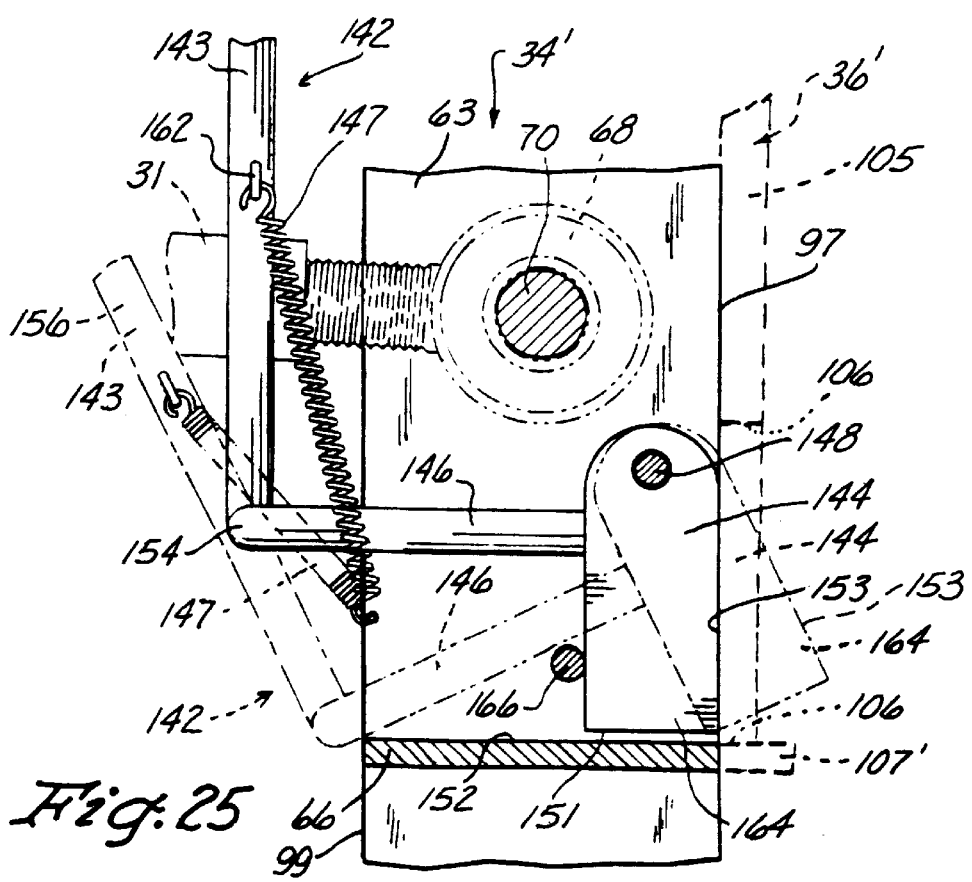
FIG. 25 shows actuation of the structure of FIG. 24.

Continued upward movement effects a clockwise movement of the latch (144), as shown in FIG. 25, until the latch (144) engages a stop bolt (166) secured across the plates (63), (64), such that the latch face (153) is flush with the male unit rear face (97). This action momentarily forces the handle (143) to a vertical position (FIG. 25) against the bias of the spring (147). When the male unit (34') reaches its maximum nested condition within the female unit (36'), the lip member (107') is disposed below the latch (144) (FIG. 25) whereby the latch (144) is free to pivotally move by action of the spring (147), through the opening (106) in the female unit (36') and back to its initial protruded position of FIG. 24. Downward, separating movement of the male unit (34') from the female unit (36') is therefore prevented by the latch (144) engaging the lip member (107').

To disengage the latch unit (142) to provide for separation of the male unit (34') from the female unit (36'), the operator need merely to turn in his/her seat (95) enough to engage the handle upper end (157) and to push the handle (143) rearwardly, pivoting it about the latch pivot pin (148) until the latch (144) engages the stop bolt (166) such that the operator is assured the latch (144) has moved to a position within the plates (63), (64) and non-protruding therefrom as shown in full lines in FIGS. 25. With the handle (143) held in this position, operation of the three-point lift (21) can then effect a lowering of the male unit (34') sufficiently that movement of the tractor (22) away from the implement (23) or vice-versa effects a complete separation of the two units (34'), (36'). Release of the handle (143) by the operator then permits the spring (147) action to return the latch unit (142) to its normal position (FIG. 24). An elongated, straight hollow tube or sleeve (not shown) may be placed over the handle (143) for aesthetic or other reasons, of a length to extend down to the bend (154). To accommodate the fastener (162), a passage would be formed in the tube, through which the fastener (162) would extend. This would also aid in securing the tube to the handle (163).

It is thus seen that all of the objectives of this invention are fulfilled by the aforementioned embodiments and the equivalents thereof.

I claim:

1. An assembly for coupling a tractor three-point power lift to a triangular three-point attachment of an implement to be towed by a tractor, the assembly comprising:

a male unit attachable to the tractor three-point power lift and having a pair of V-shaped channels facing each other and diverging downwardly and outwardly from an apex at the top thereof, and forming an A-shaped frame with a lower half of said male unit frame open for passage therethrough of a power takeoff unit;

a female unit having a pair of V-shaped channels facing each other and diverging downwardly and outwardly from an apex at the top of said female unit, said female unit V-shaped channels forming an A-shaped frame with the lower half of said female unit frame open whereby passage therethrough for the power takeoff unit is provided, a plate secured to and disposed between said female unit V-shaped channels within an upper half of said female unit frame, said female unit frame adapted to receive said male unit frame wherein said channels of said respective male and female units engage each other in a nested condition;

a latching unit attached to said male unit, said latching unit disposed above the said open lower half of each said male and female unit frames, said latching unit locking said male and female units together upon engagement of said male and female unit frames in said nested condition;

means attached to said female unit for attachment to a three-point attachment of the implement, said female unit channels having lower ends, said means including an upper element secured to an upper point of the implement attachment, including further a first plate secured to each lower end and disposed in a plane parallel to said element, and including also a second plate having a pair of non-parallel angularly related flanges, one of each of said flanges attachable to each said first plate and the other of said flanges attachable to one of a lower point of the implement attachment for effecting vertical and longitudinal adjustment between said female unit and the implement; and means for releasing said latching unit from its position locking said male and female units together.

2. An assembly for coupling a tractor three-point power lift to a triangular three-point attachment of an implement to be towed by a tractor, the assembly comprising:

a male unit attachable to the tractor three-point power lift and having a pair of V-shaped channels facing each other and diverging downwardly and outwardly from an apex at the top thereof, and forming an A-shaped frame with a lower half of said male unit frame open for passage therethrouqh of a power takeoff unit;

a female unit having a pair of V-shaped channels facing each other and diverging downwardly and outwardly from an apex at the top of said female unit, said female unit V-shaped channels forming an A-shaped frame with the lower half of said female unit frame open whereby passage therethrough for the power takeoff unit is provided, a plate secured to and disposed between said female unit V-shaped channels within an upper half of said female unit frame, said female unit frame adapted to receive said male unit frame wherein said channels of said respective male and female units engage each other in a nested condition;

a latching unit attached to said male unit, said latching unit disposed above the said open lower half of each said male and female unit frames, said latching unit locking said male and female units together upon engagement of said male and female unit frames in said nested condition;

means attached to said female unit for attachment to a three-point attachment of the implement, said female unit channels having lower ends, said means including an upper element secured to an upper point of the implement attachment, including further a first plate secured to each lower end and disposed in a plane parallel to said element, and including also a second plate having a pair of angularly related flanges, one of each of said flanges attachable to each said first plate and the other of said flanges attachable to one of a lower point of the implement attachment, and further wherein each said first plate has a flat face normally facing the implement, said face disposed in a vertical transverse plane, and at least one slot formed in said first plate; and means for releasing said latching unit from its position locking said male and female units together.

3. The coupling assembly of claim 2, and further wherein each said one flange has a flat face disposed in a vertical, transverse plane for mating with said first plate face, and at least one slot formed in said one flange and disposed angularly to said first plate slot.

4. The coupling assembly of claim 3, and further wherein each said other flange has a flat outer face also for mating with said first plate face in a vertical, transverse plane, said each other flange having a plurality of spaced openings formed therein, at least one of said openings adapted for connection to a lower point of the implement attachment.

5. The coupling assembly of claim 4, and further wherein said flanges of each said second plate are disposed at right angles to each other.

6. An assembly for coupling a tractor three-point power lift to a triangular three-point attachment of an implement to be towed by a tractor, the assembly comprising:

a male unit attachable to the tractor three-point power lift and having a pair of V-shaped channels facing each other and diverging downwardly and outwardly from an apex at the top thereof, and forming an A-shaped frame with a lower half of said male unit frame open for passage therethrouqh of a power takeoff unit;

a female unit having a pair of V-shaped channels facing each other and diverging downwardly and outwardly from an apex at the top of said female unit, said female unit V-shaped channels forming an A-shaped frame with the lower half of said female unit frame open whereby passage therethrouqh for the power takeoff unit is provided, a plate secured to and disposed between said female unit V-shaped channels within an upper half of said female unit frame, said female unit frame adapted to receive said male unit frame wherein said channels of said respective male and female units engage each other in a nested condition;

a latching unit attached to said male unit, said latching unit disposed above the said open lower half of each said male and female unit frames, said latching unit locking said male and female units together upon engagement of said male and female unit frames in said nested condition;

means attached to said female unit for attachment to a three-point attachment of the implement, said female unit channels having lower ends, said means including an upper element secured to an upper point of the implement attachment, including further a first plate secured to each lower end and disposed in a plane parallel to said element, and including also a second plate having a pair of angularly related flanges, one of each of said flanges attachable to each said first plate and the other of said flanges attachable to one of a lower point of the implement attachment and further wherein said means attached to said female unit includes a link unit having opposed ends each end adapted to be pivotally connected, respectively, to said female unit upper element and to said implement attachment upper point for movement of said link unit about horizontal axes, wherein said female unit and said implement attachment are movable relative to each other at their upper ends; and means for releasing said latching unit from its position locking said male and female units together.

7. The coupling assembly of claim 6, and further wherein said upper element has a plurality of vertically spaced openings formed therein for vertically varying the pivotal connection of said upper element with a said link unit end.

8. The coupling assembly of claim 7, and further wherein said link unit has a plurality of substantially horizontally disposed and spaced openings formed therein for longitudinally varying the pivotal connection of said link unit between said implement attachment upper point and said female unit upper element.

9. The coupling assembly of claim 8, and further wherein said releasing means includes a handle connected at one end to said latch member, said handle having an opposite end extended toward the tractor, and means interconnected between said handle and said male unit for biasing said latch member toward said first position.

10. The coupling assembly of claim 9, and further wherein in said nested condition of said male and female units said latch member is movable by said biasing means from said second position to said first position, with said latch member protruding through said opening.

11. An assembly for coupling a tractor three-point power lift to a triangular three-point attachment of an implement to be towed by a tractor, the assembly comprising:

a male unit attachable to the tractor three-point power lift and having a pair of V-shaped channels facing each other and diverging downwardly and outwardly from an apex at the top thereof, and forming an A-shaped frame with a lower half of said male unit frame open for passage therethrough of a power takeoff unit;

a female unit having a pair of V-shaped channels facing each other and diverging downwardly and outwardly from an apex at the top of said female unit, said female unit V-shaped channels forming an A-shaped frame with the lower half of said female unit frame open whereby passage therethrough for the power takeoff unit is provided, a plate secured to and disposed between said female unit V-shaped channels within an upper half of said female unit frame, said female unit frame adapted to receive said male unit frame wherein said channels of said respective male and female units engage each other in a nested condition;

a latching unit attached to said male unit, said latching unit disposed above the said open lower half of each said male and female unit frames, said latching unit locking said male and female units together upon engagement of said male and female unit frames in said nested condition;

means attached to said female unit for attachment to a three-point attachment of the implement, said female unit channels having lower ends, said means including an upper element secured to an upper point of the implement attachment, including further a first plate secured to each lower end and disposed in a plane parallel to said element, and including also a second plate having a pair of non-parallel angularly related flanges, one of each of said flanges attachable to each said first plate and the other of said flanges attachable to one of a lower point of the implement attachment for effecting vertical and longitudinal adjustment between said female unit and the implement; and means for releasing said latching unit from its position locking said male and female units together, said female unit plate having an opening formed therein with a portion of said plate disposed below said opening, said latching unit including a latch member movable from a first position protruding rearwardly from said male unit and extended through said opening wherein said mail and female units are locked against relative vertical movement, to a second non-protruding position wherein said male and female units are freely vertically movable relative to each other, said latching unit releasing means connected to said latch member, said latch member moved from said first position to said second position in response to its engagement by said female unit plate during movement of sad male unit into said nested condition with a said female unit.

12. An assembly for coupling a tractor three-point power lift to a triangular three-point attachment of an implement to be towed by the tractor, the assembly comprising:

a male unit attachable to the three-point power lift and having a pair of V-shaped channels facing each other with their apexes extended outwardly, said channels diverging downwardly and outwardly from an apex at the top thereof, and forming an A-shaped frame with the lower half of said frame open for passage therethrough of a power takeoff unit attached to the tractor;

a female unit having a pair of V-shaped channels facing each other with their apexes extended outwardly, said female unit channels diverging downwardly and outwardly from an apex at the top of said female unit, said female unit channels forming an A-shaped frame with the lower half of said female unit frame open whereby passage therethrough for the power takeoff unit is provided, said female unit adapted to receive said male unit wherein said channels of said respective male and female unit frames engage each other in a self-aligning nested condition;

a latching unit attached to said male unit, said latching unit disposed above the said lower half of said male unit frame, said latching unit automatically locking said male and female units together in response to said self-aligning engagement of said male and female unit frames into said nested condition;

means attached to said female unit for attachment to the implement three-point attachment for effecting vertical and longitudinal adjustment between said female unit and the implement; and means for releasing said latching unit from its position locking said male and female units together.

13. An assembly for coupling a tractor three-point power lift to a triangular three-point attachment of an implement to be towed by the tractor, the assembly comprising:

a male unit attachable to the three-point power lift and having a pair of V-shaped channels facing each other with their apexes extended outwardly, said channels diverging downwardly and outwardly from an apex at the top thereof, and forming an A-shaped frame with a lower half of said frame open for passage therethrough of a power takeoff unit attached to the tractor;

a female unit having a pair of V-shaped channels facing each other with their apexes extended outwardly, said female unit channels diverging downwardly and outwardly from an apex at the top of said female unit, said female unit channels forming an A-shaped frame with a lower half of said female unit frame open whereby passage therethrough for the power takeoff unit is provided, said female unit adapted to receive said male unit wherein said channels of said respective male and female unit frames engage each other in a self-aligning nested condition;

a latching unit attached to said male unit, said latching unit disposed above the said lower half of said male unit frame, said latching unit automatically locking said male and female units together in response to said self-aligning engagement of said male and female unit frames into said nested condition; and the implement having an upper point and a pair of transversely spaced lower points, said female unit channels having lower ends, a first plate secured to each lower end and disposed in a plane transverse to the towing direction of the implement, a second plate having a pair of angularly related flanges, one of each of said flanges attachable to each said first plate and the other of said flanges attachable to one of the lower points of the implement attachment, whereby said first and second plate attachments provide vertical and longitudinal adjustment of said implement and said female unit relative to each other, and an upper element attachable between said female unit frame and an upper point of the implement frame, whereby all three implement points are attachable to said female unit frame.

* * * * *